(12) United States Patent
Hasselbusch (10) Patent No.: US 6,474,754 B1
(45) Date of Patent: Nov. 5, 2002

(54) ROLLER ASSEMBLY FOR AN UNDERCARRIAGE OF A WORK MACHINE

(75) Inventor: Michael D. Hasselbusch, Metamora, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/645,380

(22) Filed: Aug. 24, 2000

(51) Int. Cl.⁷ .................................................. B62D 55/15
(52) U.S. Cl. ........................................ 305/136; 305/137
(58) Field of Search .............................. 305/136, 137, 305/138, 124

(56) References Cited

U.S. PATENT DOCUMENTS

| | | | | |
|---|---|---|---|---|
| 2,474,057 A | * | 5/1949 | Tourneau | 305/136 |
| 2,775,492 A | * | 12/1956 | Wirkkala | 305/137 |
| 3,116,957 A | * | 1/1964 | Fikse | 305/136 |
| 3,336,087 A | * | 8/1967 | Reinsma | 305/136 |
| 3,372,940 A | | 3/1968 | Keller | |
| 3,869,931 A | * | 3/1975 | Boggs | 305/119 |
| 4,371,362 A | | 2/1983 | Dorris | |
| 5,553,931 A | | 9/1996 | Diekevers | |
| 5,803,558 A | * | 9/1998 | Ketting et al. | 305/119 |

FOREIGN PATENT DOCUMENTS

| | | | |
|---|---|---|---|
| FR | 1360552 | | 6/1963 |
| FR | 1.360.552 A | * | 3/1964 |
| SU | 2006408 C1 | | 4/1992 |

\* cited by examiner

*Primary Examiner*—S. Joseph Morano
*Assistant Examiner*—Frantz F. Jules
(74) *Attorney, Agent, or Firm*—Maginot, Addison & Moore; Calvin E Glastetter; Thomas L Derry (57) ABSTRACT

A roller assembly with a body member. The roller assembly also has a first roller rim secured to the body member. The first roller rim has (i) a first inner side wall segment extending outwardly from the roller surface, (ii) a first outer side wall segment secured to the first inner side wall segment, the first outer side wall segment being positioned relative to an axis of rotation of the body member such that a linear extension of the first outer side wall segment intersects the axis of rotation so as to define an acute angle therebetween, and (iii) a receptacle defined therein. The roller assembly further includes an axle mounting arrangement positioned within the receptacle such that no portion of the axle mounting arrangement traverses the first plane.

20 Claims, 7 Drawing Sheets

ROLLER ASSEMBLY FOR AN UNDERCARRIAGE OF A WORK MACHINE

TECHNICAL FIELD

This invention relates generally to work machines and, more particularly, to a roller assembly for an undercarriage of a work machine.

BACKGROUND ART

Track type work machines utilize an endless track chain assembly joined together by interconnected link arrangements. The link arrangements include overlapping link members which form a pair of continuous rails. A plurality of track rollers bear the weight of the machine, and guide the track chain by engaging the link rails as the track chain rotates about a drive sprocket wheel and one or more idler wheels. Each track roller is typically mounted to a frame via a pair of collars. In particular, the first collar extends outwardly in an axial direction from one end of the track roller. The second collar extends outwardly from the other end of the track roller in a corresponding manner. The collars support the axle of the roller such that the roller can rotate from frictional engagement with the moving link rails as the work machine is propelled over the ground. However, a problem with the above described arrangement is that the collars are susceptible to being struck and damaged by objects (e.g. rocks) in the environment of the work area.

One approach to solving this problem is to protect the mechanism utilized to support the axle within a cavity defined in a roller. For example, Patent RU 2006408 C1 discloses a roller having the axle mounting mechanism disposed within a cavity defined in the roller. However, one problem with this approach is that the cavity must be large enough to accommodate the axle mounting mechanism. Enlarging cavity to accommodate the axle mounting mechanism can structurally weaken the roller which can cause maintenance problems.

What is needed therefore is a roller assembly for an undercarriage of a work machine which overcomes one or more of the above-mentioned drawbacks.

DISCLOSURE OF THE INVENTION

In accordance with one embodiment of the present invention, there is provided a roller assembly for an undercarriage of a work machine. The roller assembly includes a body member having (i) a passageway extending therethrough and (ii) a roller surface defined thereon. The roller assembly also includes a first roller rim secured to the body member. The first roller rim has (i) a first inner side wall segment extending outwardly from the roller surface, (ii) a first outer side wall segment secured to the first inner side wall segment, the first outer side wall segment being positioned relative to an axis of rotation of the body member such that a linear extension of the first outer side wall segment intersects the axis of rotation so as to define an acute angle therebetween, and (iii) a receptacle defined therein. The receptacle has an outer entrance and an inner entrance. The outer entrance is defined by a first edge having a first point, a second point, and a third point disposed thereon. The first point, the second point, and the third point define a first plane. The roller assembly further includes an axle mounting arrangement positioned within the receptacle such that no portion of the axle mounting arrangement traverses the first plane.

In accordance with another embodiment of the present invention, there is provided a roller assembly for an undercarriage of a work machine. The roller assembly includes a body member having (i) a passageway extending therethrough and (ii) a roller surface defined thereon. The roller assembly also includes a first roller rim secured to the body member. The first roller rim has (i) a first inner side wall segment extending outwardly from the roller surface, (ii) a first outer side wall segment secured to the first inner side wall segment, the first outer side wall segment is positioned relative to an axis of rotation of the body member such that a first linear extension of the first outer side wall segment intersects the axis of rotation so as to define a first acute angle therebetween, and (iii) a first receptacle defined therein. The first receptacle has a first outer entrance and a first inner entrance. The first outer entrance is defined by a first edge having a first point, a second point, and a third point disposed thereon. The first point, the second point, and the third point define a first plane. The roller assembly further includes a first axle mounting arrangement positioned within the first receptacle such that no portion of the first axle mounting arrangement traverses the first plane. The roller assembly also includes a second roller rim secured to the body member. The second roller rim has (i) a second inner side wall segment extending outwardly from the roller surface, (ii) a second outer side wall segment secured to the second inner side wall segment, the second outer side wall segment being positioned relative to the axis of rotation of the body member such that a second linear extension of the second outer side wall segment intersects the axis of rotation so as to define a second acute angle therebetween, and (iii) a second receptacle defined therein. The second receptacle has a second outer entrance and a second inner entrance. The second outer entrance is defined by a second edge having a fourth point, a fifth point, and a sixth point disposed thereon. The fourth point, the fifth point, and the sixth point define a second plane. The roller assembly further includes a second axle mounting arrangement positioned within the second receptacle such that no portion of the second axle mounting arrangement traverses the second plane.

In accordance with still another embodiment of the present invention, there is provided a work machine. The work machine includes a frame and a work implement mechanically coupled to the frame. The work machine also includes a roller assembly mechanically coupled to the frame. The roller assembly has (i) a body member, (ii) a passageway extending through the body member, (iii) a roller surface defined on the body member, and (iv) a first roller rim secured to the body member, the first roller rim having (A) a first inner side wall segment extending outwardly from the roller surface, (B) a first outer side wall segment secured to the first inner side wall segment, the first outer side wall segment being positioned relative to an axis of rotation of the body member such that a linear extension of the first outer side wall segment intersects the axis of rotation so as to define an acute angle therebetween, and (C) a receptacle defined therein. The receptacle has an outer entrance and an inner entrance. The outer entrance is defined by a first edge having a first point, a second point, and a third point disposed thereon. The first point, the second point, and the third point define a first plane. A first axle mounting arrangement is positioned within the receptacle such that no portion of the first axle mounting arrangement traverses the first plane.

BEST MODE FOR CARRYING OUT THE INVENTION

Figure 1:
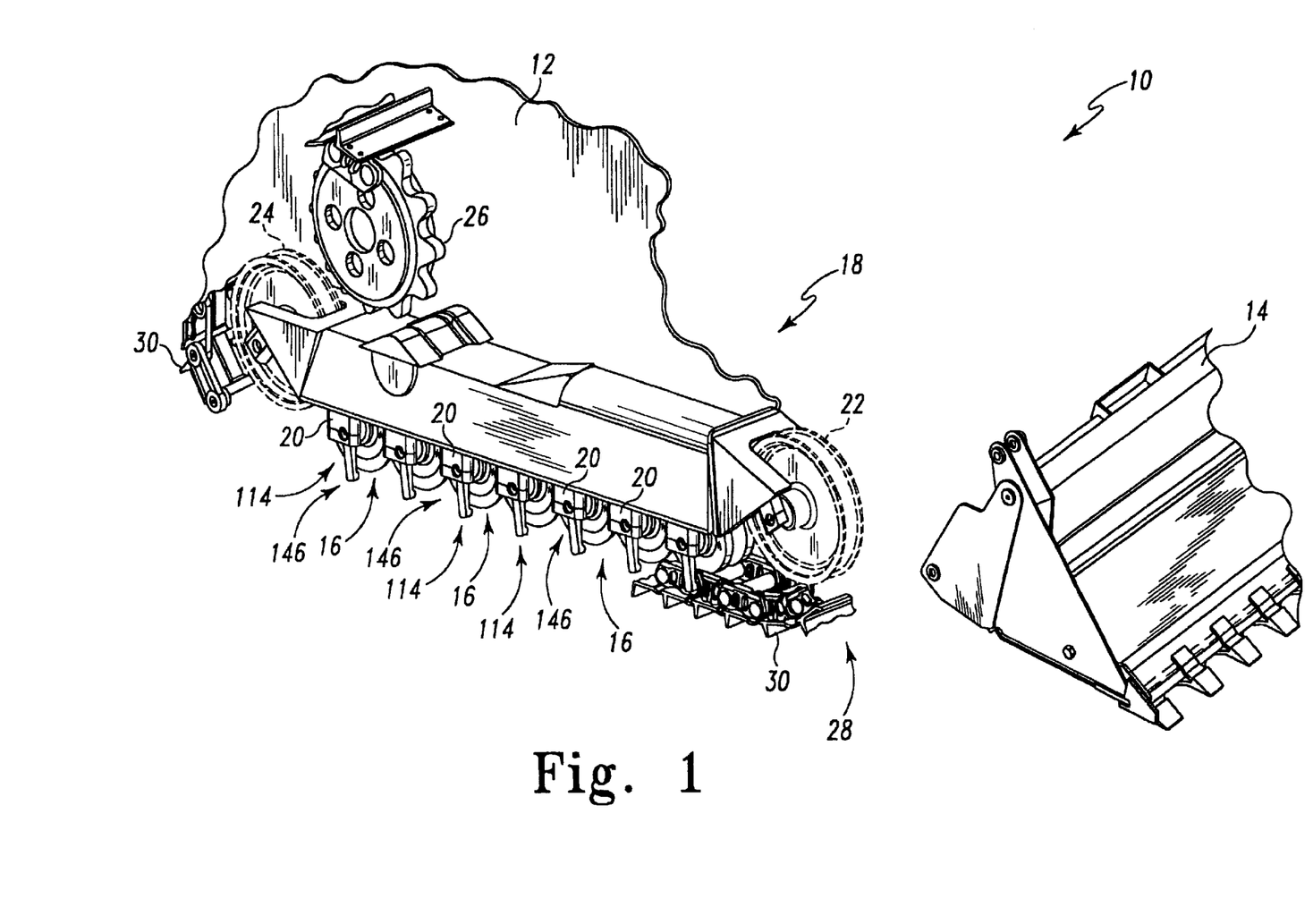
FIG. 1 is a fragmentary perspective view of a work machine which incorporates the features of the present invention therein.

Referring now to FIG. 1 there is shown a portion of a track type work machine 10 which incorporates the features of the present invention therein. Work machine 10 includes a frame 12, a work implement 14 (e.g. a bucket), an undercarriage 18, and a track assembly 28. Work implement 14 and undercarriage 18 are both mechanically coupled to frame 12. Undercarriage 18 includes a rear idler 24, a drive sprocket 26, a front idler 22, an undercarriage frame 20, and a track assembly 28. Rear idler 24, drive sprocket 26, front idler 22, and undercarriage frame 20 are all mechanically coupled to frame 12 so as to define the path abut which track assembly 28 rotates during the use of work machine 10. Undercarriage 18 also includes a number of roller assemblies 16 and guiding arrangements 146 mechanically coupled to undercarriage frame 20.

Figure 2:
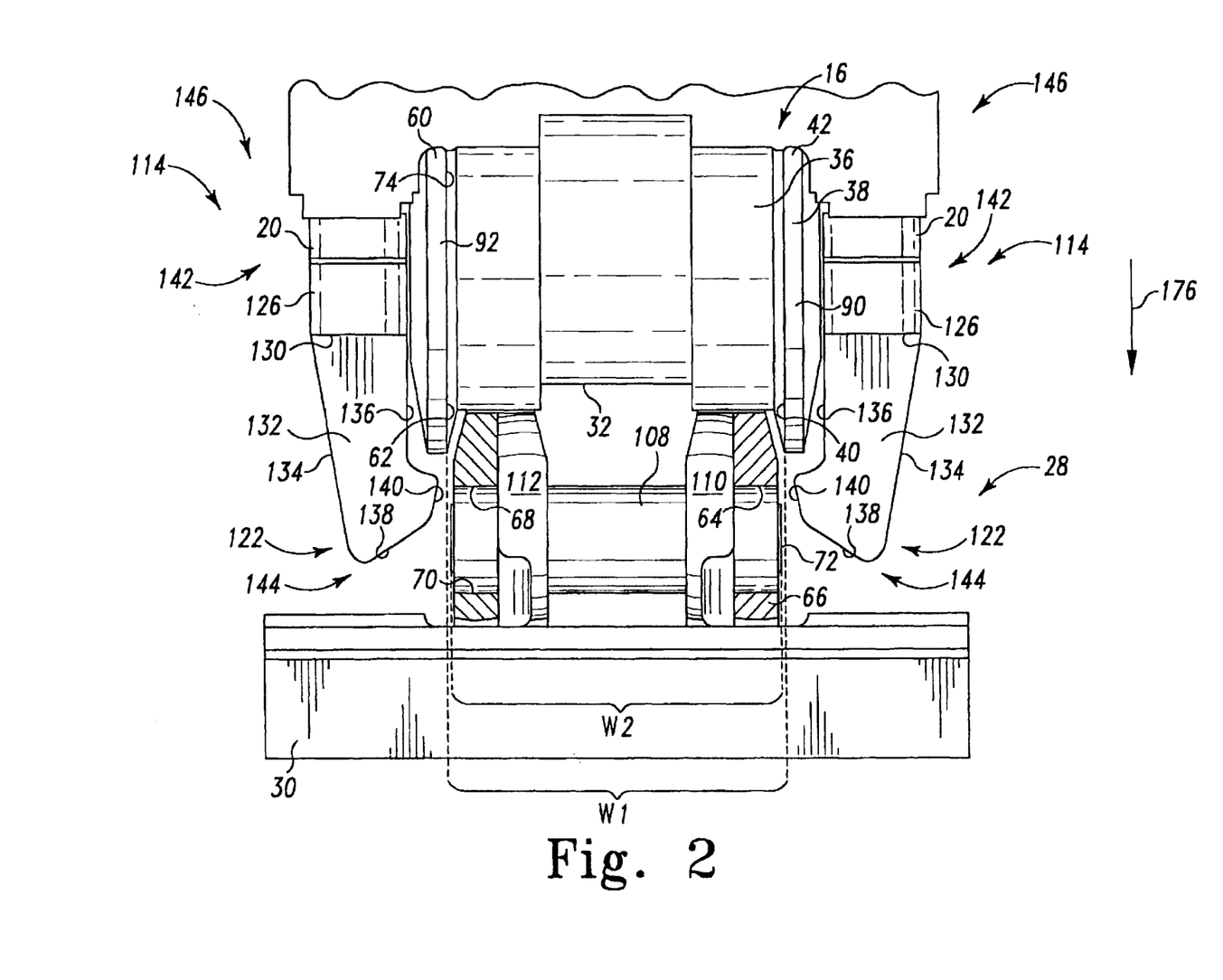
FIG. 2 is a fragmentary front elevational view of a roller assembly engaging the track assembly of the work machine of FIG. 1, note that a pair of guiding arrangements are also shown.

As shown in FIGS. 1 and 2 track assembly 28 includes an outer link 64 and an outer link 68 mechanically coupled to a pair of inner links 110 and 112. In particular, outer link 64 has an end portion with an aperture 66 defined therethrough. Inner link 110 also has an end portion with an aperture (not shown) defined therethrough. Outer link 64 and inner link 110 are positioned relative to one another such that aperture 66 and the aperture defined in inner link 110 are linearly aligned. Outer link 68 has an end portion with an aperture 70 defined therethrough. Inner link 112 also has an end portion with an aperture (not shown) defined therethrough. Outer link 68 and inner link 112 are positioned relative to one another such that aperture 70 and the aperture defined in inner link 112 are linearly aligned. A bushing 108 having a passageway (not shown) with a track pin 72 disposed therein is inserted through apertures 66 and 70 and the apertures defined in inner links 110 and 112. Inserting bushing 108 and track pin 72 in the above described manner mechanically couples outer links 64 and 68 to inner links 110 and 112. The other end portion of outer links 64 and 68 are coupled to another adjacent pair of inner links 110 and 112 with a bushing 108 and a track pin 72 in a substantially identical manner. A plurality of outer links 64 and 68 and inner links 110 and 112 are coupled together in the above described manner until a continuous loop is formed. A number of track shoes 30 are then secured to the links of track assembly 28 in a well known manner.

Figure 3:
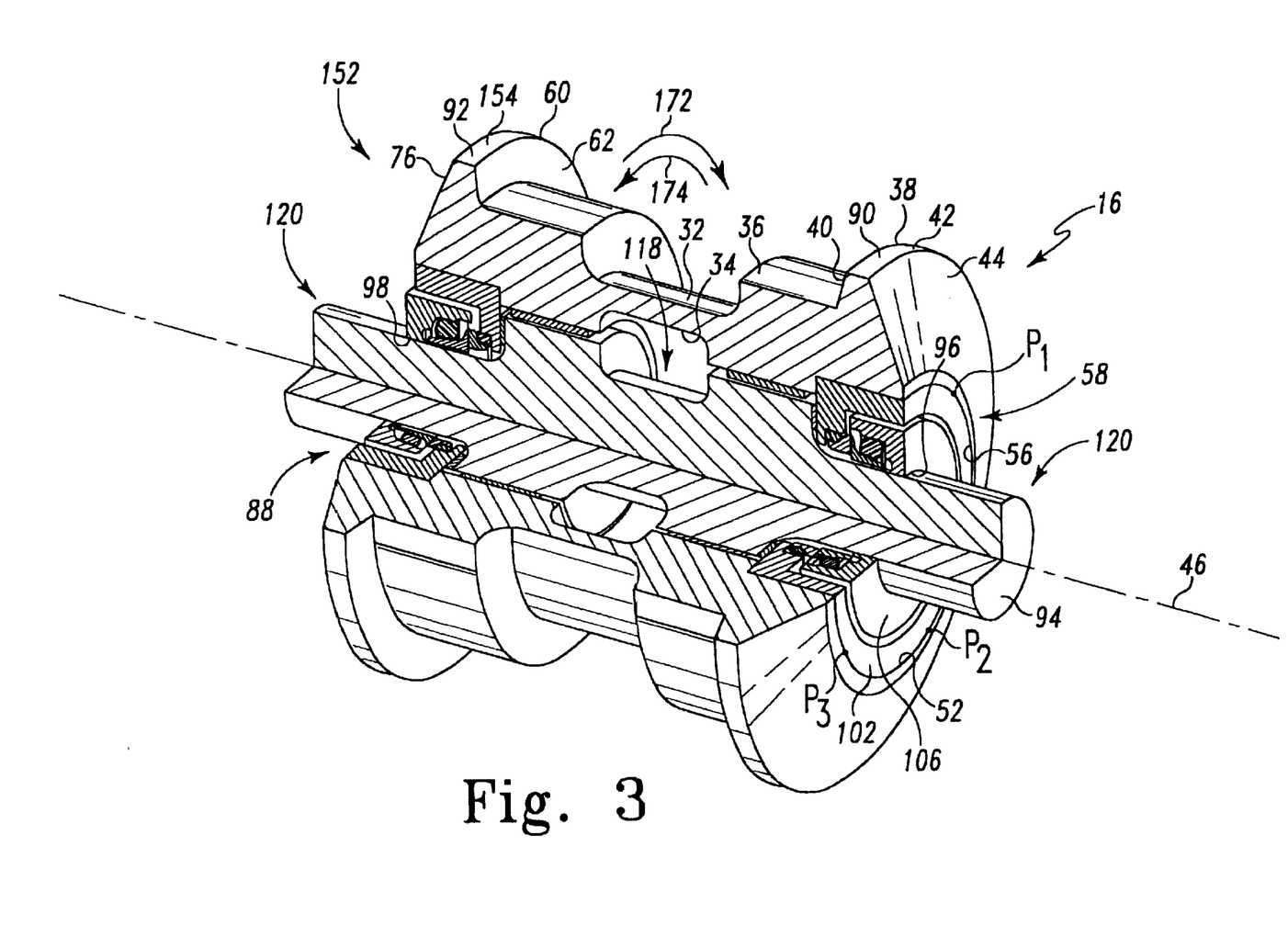
FIG. 3 is a cross sectional perspective view of the roller assembly of FIG. 2.
Figure 4:
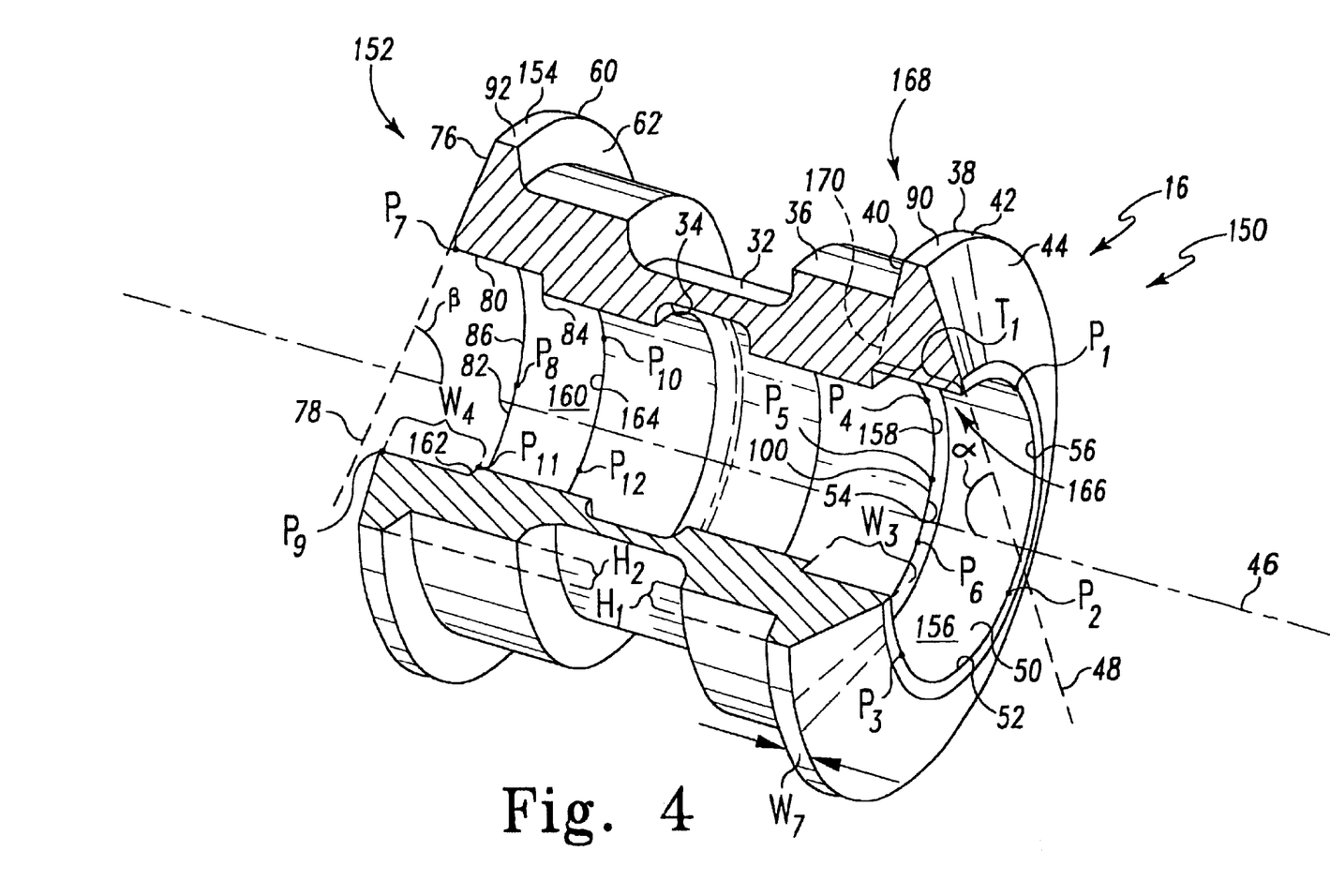
FIG. 4 is a cross sectional perspective view of the roller assembly of FIG. 3 with the axle and axle mounting arrangement shown removed.
Figure 5:
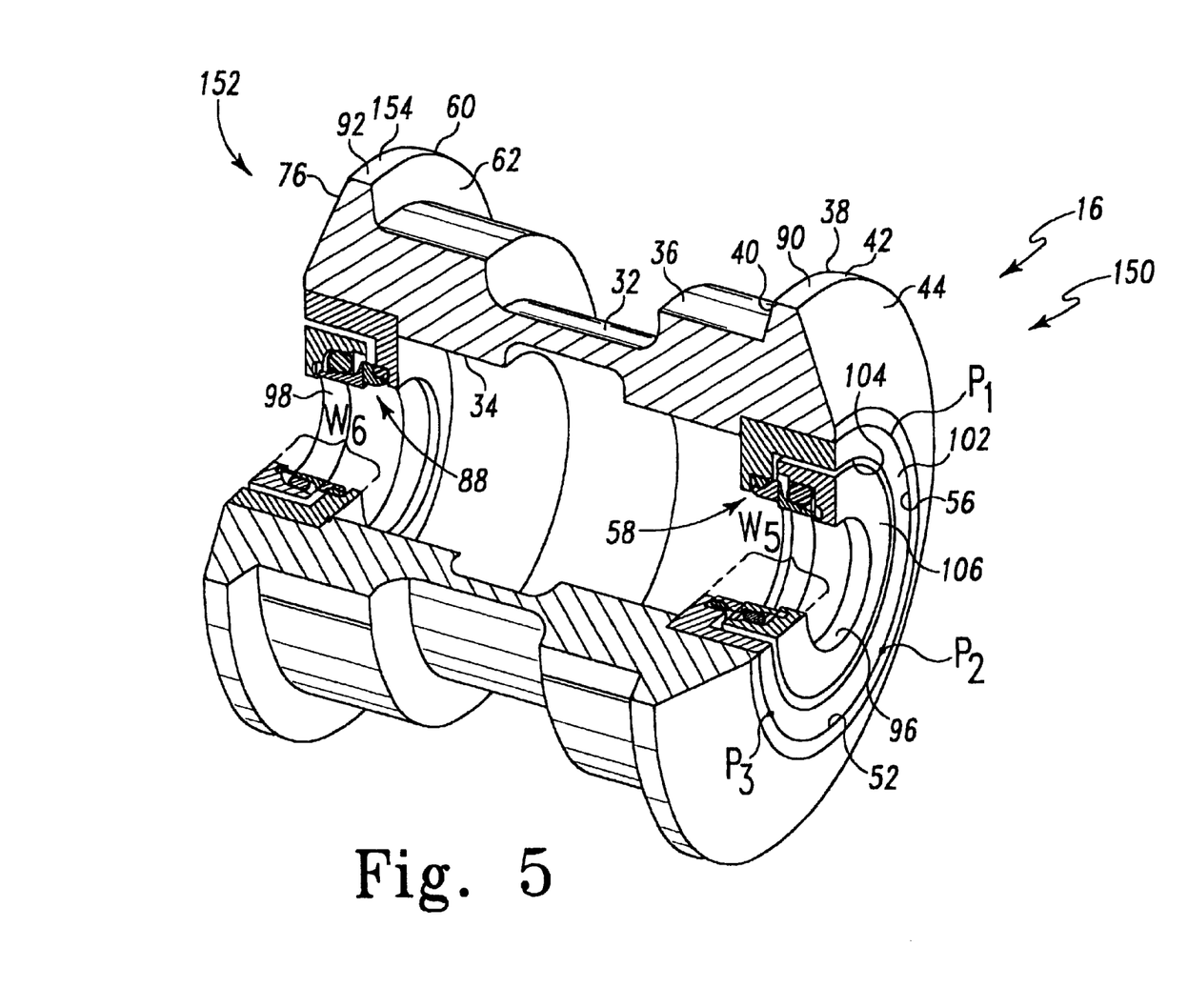
FIG. 5 is a cross sectional perspective view of the roller assembly of FIG. 3 with the axle shown removed.

Referring to FIGS. 3, 4, and 5, each roller assembly 16 has a body member 32 with (i) a passageway 34 extending therethrough and (ii) a roller surface 36 defined thereon. An end portion 150 of body member 32 has an inner side wall segment 40 which extends outwardly from roller surface 36. An outer side wall segment 44 is secured to inner side wall segment 40 via an end wall segment 42 interposed inner side wall segment 40 and outer side wall segment 44. Inner side wall segment 40 and outer side wall segment 44 define a roller rim 38 in the form of an annular flange 90 which extends outwardly from roller surface 36. As shown more clearly in FIG. 4, outer side wall segment 44 is positioned relative to an axis of rotation 46 of body member 32 such that a linear extension 48 of outer side wall segment 44 intersects axis of rotation 46 so as to define an acute angle α therebetween. For example, α can be 45 to 90 degrees.

Another end portion 152 of body member 32 also has an inner side wall segment 62 which extends outwardly from roller surface 36. An outer side wall segment 76 is secured to inner side wall segment 62 via an end wall segment 154 interposed inner side wall segment 62 and outer side wall segment 76. Inner side wall segment 62 and outer side wall segment 76 also define a roller rim 60 in the form of an annular flange 92 which extends outwardly from roller surface 36. Outer side wall segment 76 is positioned relative to axis of rotation 46 of body member 32 such that a linear extension 78 of outer side wall segment 46 also intersects axis of rotation 46 so as to define an acute angle β therebetween. For example, β can be 45 to 90 degrees. It should be appreciated that inner side wall segment 40 and inner side wall segment 62 define a roller space 74 having a width $W_1$ therebetween.

Flanges 90 extends outwardly from roller surface 36 at a height $H_1$ of about 20 millimeters to about 30 millimeters. In addition, flange 92 extends outwardly from roller surface 36 at a height $H_2$ of about 20 millimeters to about 30 millimeters. Preferably, flanges 90 and 92 extend outwardly from roller surface 36 at a height $H_1$ and $H_2$, respectively, of about 21.5 millimeters. As will be discussed below in greater detail, having a flanges 90 and 92 extend from roller surface 36 about 20 millimeters to about 30 millimeters is an advantage of the present invention since a flange with a height of less than about 20 millimeters does not provide a reliable guiding function. On the other hand a flange with a height of more than about 30 millimeters tends to be structurally weak and is therefore prone to being fractured or broken during use of work machine 10.

Body member 32 has a receptacle 50 defined therein. Receptacle 50 is defined by wall a segment 156 and a wall segment 158. Receptacle 50 has an outer entrance 52 and an inner entrance 54. Outer entrance 52 is defined by an edge 56 of wall segment 156. Edge 56 has a point $P_1$, a point $P_2$, and a point $P_3$ defined thereon. Points $P_1$, $P_2$, and $P_3$ define a first plane. Inner entrance 54 is defined by an edge 100 of wall segment 158. Edge 100 has a point $P_4$, a point $P_5$, and a point $P_6$ defined thereon. Points $P_4$, $P_5$, and $P_6$ define a second plane.

Body member 32 also has a receptacle 80 defined therein. In a similar manner as that described above, receptacle 80 is defined by wall a segment 160 and a wall segment 162. Receptacle 80 has an outer entrance 82 and an inner entrance 84. Outer entrance 82 is defined by an edge 86 of wall segment 160. Edge 86 has a point $P_7$, a point $P_8$, and a point $P_9$ defined thereon. Points $P_7$, $P_8$, and $P_9$ define a third plane. Inner entrance 84 is defined by an edge 164 of wall segment 162. Edge 164 has a point $P_{10}$, a point $P_{11}$, and a point $P_{12}$ defined thereon. Points $P_{10}$, $P_{11}$, and $P_{12}$ define a fourth plane.

Roller assembly 16 also includes an axle mounting arrangements 58 and 88. Axle mounting arrangement 88 is substantially identical to axle mounting arrangement 58 therefore only axle mounting arrangement 58 will be described in detail herein. Axle mounting arrangement 58 includes a retainer 102 with a cavity 104 defined therein. Axle mounting arrangement 58 also includes a collar 106 positioned within cavity 104. Retainer 102, with collar 106 located therein, is press fit into receptacle 50. Axle mounting arrangement 88 is press fit into receptacle 80 in a substantially identical manner.

It should be appreciated that having outer side wall segment 44 positioned relative to axis of rotation 46 of body member 32 such that linear extension 48 of outer side wall segment 44 intersects axis of rotation 46 so as to define an acute angle α therebetween allows the width $W_3$ (see FIG. 4) of receptacle 50 to greater than or equal to the width $W_5$ (see FIG. 5) of axle mounting arrangement 58. Therefore, when axle mounting arrangement 58 is located in receptacle 50 no portion of axle mounting arrangement 58 traverses the first plane defined by points $P_1$, $P_2$, and $P_3$ or the second plane defined by points $P_4$, $P_5$, and $P_6$. Having receptacle 50 configured so that no portion of axle mounting arrangement 58 traverses the first plane or second plane is an advantage of the present invention. In particular having axle mounting arrangement 58 completely contained within receptacle 50 prevents axle mounting arrangement 58 from being struck and damaged by objects (e.g. rocks) present in the environment of the work machine 10.

Moreover, having outer side wall segment 44 positioned relative to axis of rotation 46 in the above described manner results in roller rim 38 having a base 166 which is relatively thick or wide as compared to the thickness or width of apex 168 of roller rim 38. In particular, thickness $T_1$ of base 166 as measured from a linear extension 170 of inner side wall segment 40 to edge 56 is significantly greater than the thickness of apex 168 as determined by the width $W_7$ of end wall segment 42. Having a relatively thick base 166 as compared to the width $W_7$ of apex 168 increases the strength of roller rim 38 relative to other roller assembly designs. For example, roller assembly 16 of the present invention is structurally stronger as compared to other roller assembly designs in which the outer side wall segment is positioned relative to the axis of rotation such that a linear extension of the outer side wall segment intersects the axis of rotation so as to define a substantially 90° angle.

It should be understood that having outer side wall segment 76 positioned relative to axis of rotation 46 in the same manner as outer wall segment 44 results in the same advantages as described above. In particular, width $W_4$ (see FIG. 4) of receptacle 80 is greater than or equal to the width $W_6$ (see FIG. 5) of axle mounting arrangement 88. Therefore, when axle mounting arrangement 88 is located in receptacle 80 no portion of axle mounting arrangement 88 traverses the third plane defined by points $P_7$, $P_8$, and $P_9$ or the fourth plane defined by points $P_{10}$, $P_{11}$, and $P_{12}$. As previously discussed, having receptacle 80 configured so that no portion of axle mounting arrangement 88 traverses the third plane or the fourth plane prevents axle mounting arrangement 88 from being struck and damaged by objects (e.g. rocks) present in the environment of the work machine 10. In addition, the structural strength advantages discussed in reference to outer wall segment 44 also apply to outer wall segment 76.

As shown in FIG. 3, an axle 94 is positioned within passageway 94 of body member 32 such that axle 94 extends through an aperture 96 of axle mounting arrangement 58 and an aperture 98 of axle mounting arrangement 88. Positioning axle 94 in the above described manner results in (i) a portions 120 of axle 94 being located outside of passageway 34 (see FIG. 3) and (ii) a portion 118 of axle 94 being located within passageway 34 (see FIG. 3). It should be appreciated that body member 32 can rotate relative to axle 94 in the direction indicated by arrows 172 and 174.

Figures 6, 7:
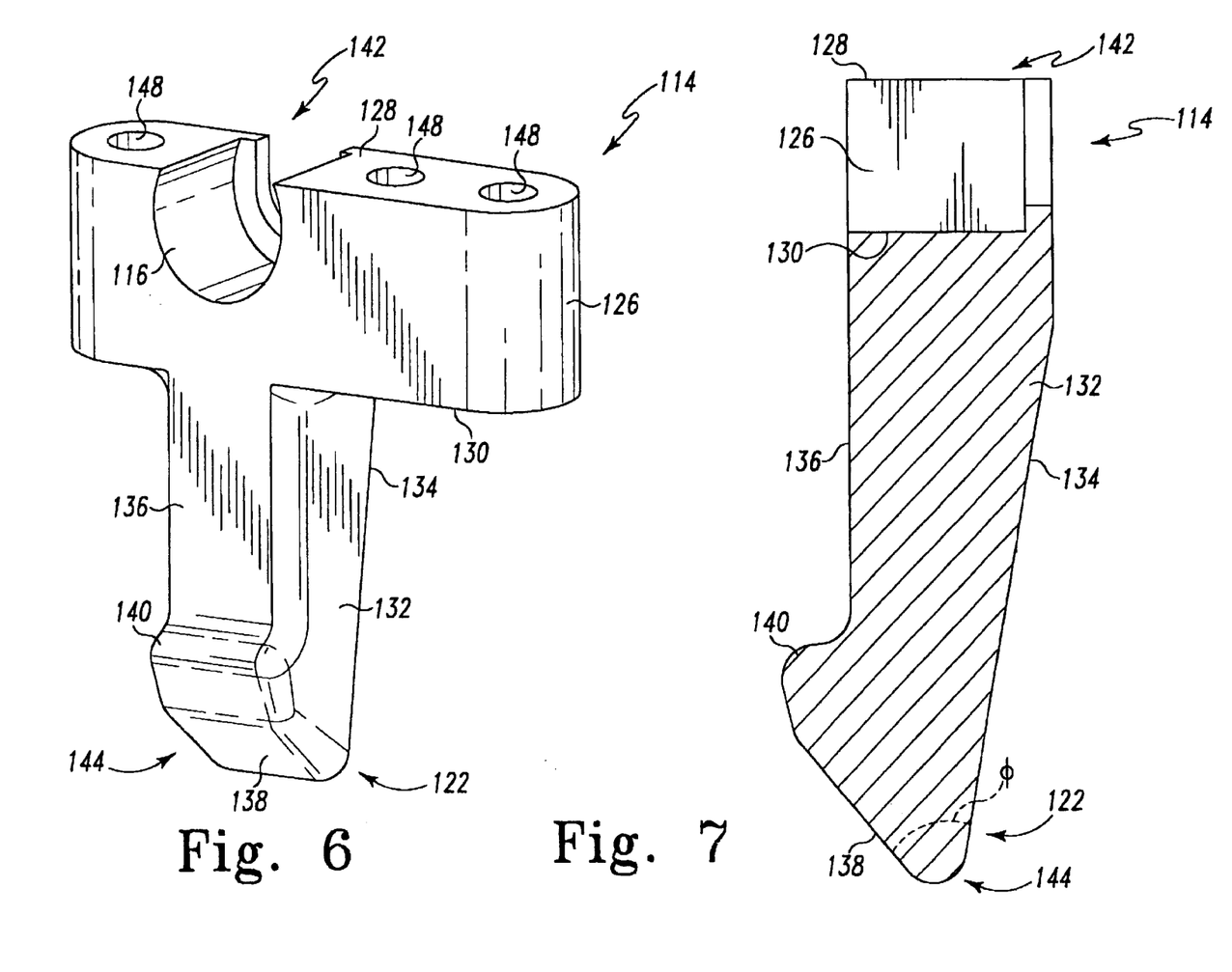
FIG. 6 is a perspective view of one guiding arrangement shown in FIG. 2.
FIG. 7 is a cross sectional view of the guiding arrangement shown in FIG. 6.
Figure 8:
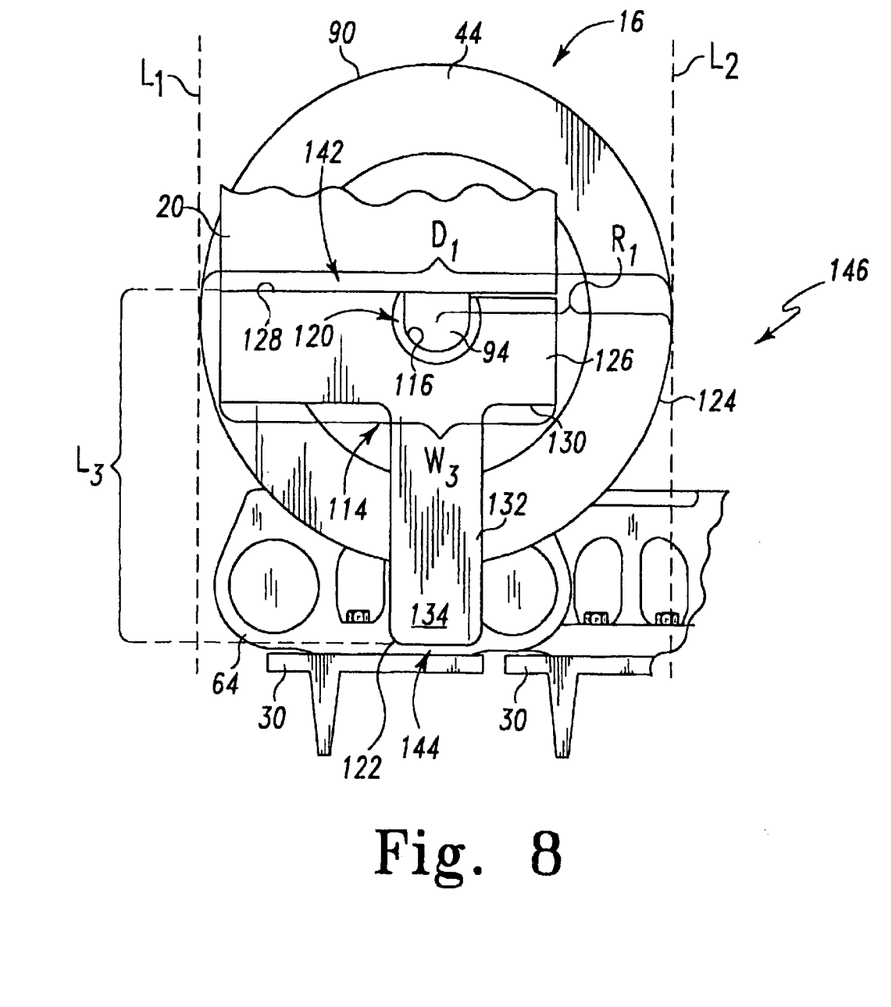
FIG. 8 is a side elevational view of a roller assembly, a guide structure, and a portion of the track assembly of the work machine of FIG. 1.

Referring to FIGS. 6, 7, and 8, guiding arrangement 146 includes a guide structure 114 having a first end 142 and a second end 144. Guide structure 114 includes a mounting member 126 having an upper surface 128 and a lower surface 130. Mounting member 126 also has an opening 116 defined in upper surface 128 thereof. Mounting member 126 also has a number of bolt holes 148 defined therein. Guide structure 114 further includes a leg member 132 extending from lower surface 130 of mounting member 126. Leg member 132 is preferably positioned directly below opening 116. Leg member 132 has a (i) a lateral side wall 134, (ii) a lateral side wall 136, and (iii) an end wall segment 138. Lateral side wall 134 is secured to end wall segment 138 so as to define an acute angle φ therebetween (see FIG. 7). Lateral side wall segment 136 has a protrusion 140 extending therefrom.

Guide structure 114 is positioned relative to roller assembly 16 so that portion 120 of axle 94 is located within opening 116. Mounting member 126 is then fastened to undercarriage frame 20 utilizing a number of bolts (not shown) inserted through bolt holes 148 and screwed into undercarriage frame 20 so that upper surface 128 is in contact with undercarriage frame 20. A second guide structure 114 is positioned relative to the same roller assembly 16 such that the other portion 120 of axle 94 is located within opening 116. The mounting member 126 of this guide structure 114 is secured to an opposing side of undercarriage frame 20 so as to rotatably mount body member 32 of roller assembly 16 to undercarriage frame 20. Positioning guide structure 114 in the above described manner results in leg member 132 extending from axle 94, and therefore axis of rotation 46, in a radial direction.

As shown more clearly in FIG. 8, guide structure 114 has a length $L_3$ and a width $W_3$, and flange 90 of roller assembly 16 has a diameter $D_1$ and a radius $R_1$. Length $L_3$ is greater radius $R_1$ so that when axle 94 is positioned within opening 116 of mounting member 126 in the above described manner a detached end 122 defined on second end 144, and thus leg member 132, of guide structure 114 extends beyond a peripheral edge 124 of flange 90. Moreover, width $W_3$ of guide structure 114 is less than diameter $D_1$ of flange 90 so that when axle 94 is located within opening 116 guide structure 114 is interposed a vertical tangential line $L_1$ and a vertical tangential line $L_2$ of flange 90. Having the width $W_3$ configured so that guide structure 114 fits between vertical tangential line $L_1$ and a vertical tangential line $L_2$ of flange 90 is an advantage of the present invention since it decreases the size of guide structure 114 which in turn decreases the weight and cost of manufacturing guide structure 114. This is contrast to other guide structure designs which have an elongated shape which substantially run the entire length of the undercarriage. These type of guide structures are relatively heavy and expensive to manufacture as compared to the present invention.

It should be understood that utilizing and positioning guide structure 114 relative to axle 94 in the above described manner enhances the guiding function of guide structure 114. In particular, utilizing guide structure 114 to mount roller assembly 16 to undercarriage frame 20 and having leg member 132 extend from axle 94 in a radial direction ensures that guide structure 144 is positioned directly adjacent to the track assembly 28/roller assembly 16 interface.

Having guide structure 144 directly adjacent to the track assembly 28/roller assembly 16 interface facilitates the ability of guide structure 114 to direct track assembly 28 back into roller space 74 and into contact with roller surface 36 if derailment of track assembly 28 does occur.

In addition, having guide structure 114 is positioned directly adjacent to the track assembly 28/roller assembly 16 interface allows track assembly 28 to back bend up between roller assemblies 16 during use of work machine 10 without the guide structures 114 interfering with track assembly 28 during the back bend. Other designs which position the guide structures between adjacent roller assemblies have to be located a greater distance away from the track assembly so they do not interfere with the aforementioned back bend function. Having the guide structures located a greater distance away from the track assembly decreases their ability to direct the track assembly back into the roller space if a derailment occurs.

Track assembly 28 is disposed around front idler 22, rear idler 24, and drive sprocket 26. In addition, as shown in FIG. 2, track assembly 28 is positioned relative to roller assemblies 16 such that (i) track assembly 28 is located within roller space 74 and (ii) outer links 64 and 68 and inner links 110 and 112 are in contact with roller surface 36. It should be understood that (i) roller space 74 has a width $W_1$, (ii) track assembly 28 has a width $W_2$ (note that track assembly 28 does not include track shoes 30), and (iii) width $W_1$ is greater than width $W_2$. Having the width $W_2$ of track assembly 28 smaller than the width $W_1$ of roller space 74 is an advantage of the present invention. In particular, as track assembly 28 is utilized the surfaces of outer links 64 and 68 and inner links 110 and 112 in contact with roller surface 36 tend to wear down which in turn causes roller assembly 16 to move in the direction indicated by arrow 176. Having the width $W_2$ of track assembly 28 smaller than the width $W_1$ of roller space 74 results in an obstruction free path for roller assembly 16 to move in the direction of arrow 176. In other words, no portion of track assembly 28 protrudes outwardly such that track assembly 28 would obstruct the movement of roller assembly 16 in the direction of arrow 176. Therefore, track assembly 28 can be utilized longer, or worn down to a greater extent, before requiring maintenance. This is in contrast to other roller assembly and track assembly designs in which the width of the track assembly is greater than the width of the roller space. For example, the track assembly may have a track pin boss which protrudes outwardly and is located directly under a flange of the roller assembly. In this situation, the pin boss limits the distance the roller assembly can travel in the direction indicated by arrow 176 since the roller assembly will eventually contact the pin boss and thus cause undue wear on the roller assembly. As such, the track assembly will require maintenance in a relatively shorter period of time as compared to the present invention.

INDUSTRIAL APPLICABILITY

During use of work machine 10, track assembly rotates around a path defined by front idler 22, rear idler 24, drive sprocket 26, and roller assemblies 16 thereby propelling work machine 10 over the ground to perform various work functions with implement 14. During the aforementioned rotation track assembly 28 is maintained within roller space 74 by flanges 90 and 92. It should be understood that flanges 90 and 92 have heights $H_1$ and $H_2$, respectively, (i.e. about 20 millimeters to about 30 millimeters) that only two flanges per roller assembly 16 are required to provide the primary guiding function and maintain track assembly 28 within roller space 74 and in contact with roller surface 36. This is in contrast to other roller assembly designs which require four flanges extending from the roller surface (one inner and one outer link are interposed one pair of flanges) to provide the primary guiding function. Having four flanges extending from the roller surface increases the cost of manufacturing the roller assemblies.

However, if track assembly 28 does become disengaged from the roller assemblies 16, guide structures 114 are positioned so as to effectively direct track assembly 28 back into roller space 74. In particular, detached end 122 of leg member 132 contact track assembly 28 and directs the same back into roller space 74. Specifically, end wall segment 138 contact track assembly 28 so as to direct the same back into roller space 74. It should be appreciated that having end wall segment 138 and lateral side wall segment 134 spatially oriented so as to define an acute angle φ therebetween (see FIG. 7) facilitates the guiding of track assembly 28 back into roller space 74. This is true since the angling of end wall segment 138 directs track assembly 28 back toward roller space 74 when track assembly comes into contact with end wall segment 138. This is different from other guide structures which have a squared off detached end which is less effective in directing a disengaged track assembly back to the roller space.

Other aspects, objects and advantages of this invention can be obtained from a study of the drawings, disclosures, and the appended claims.

What is claimed is:

1. A roller assembly for an undercarriage of a work machine, comprising:
   a body member having (i) a passageway extending therethrough and (ii) a roller surface defined thereon;
   a first roller rim secured to said body member, said first roller rim having (i) a first inner side wall segment extending outwardly from said roller surface, (ii) a first outer side wall segment secured to said first inner side wall segment, said first outer side wall segment being positioned relative to an axis of rotation of said body member such that a linear extension of said first outer side wall segment intersects said axis of rotation so as to define an acute angle therebetween, and (iii) a receptacle defined therein, said receptacle having an outer entrance and an inner entrance, said outer entrance is defined by a first edge having a first point, a second point, and a third point disposed thereon, said first point, said second point, and said third point defining a first plane; and
   an axle mounting arrangement positioned within said receptacle such that no portion of said axle mounting arrangement traverses said first plane.

2. The roller assembly of claim 1, including:
   a second roller rim secured to said body member, said second roller rim having a second inner side wall segment extending outwardly from said roller surface; and
   a track assembly having (i) a first outer link with a first aperture defined therein, (ii) a second outer link with a second aperture defined therein, and (iii) a track pin positioned within said first aperture and said second aperture,
   wherein (i) said first inner side wall segment and said second inner side wall segment define a roller space therebetween, said roller space having a width $W_1$, (ii) said track assembly has a with $W_2$ which is less than said width $W_1$, and (iii) said track assembly is located within said roller space so that said first outer link and said second outer link is in contact with said roller surface.

3. The roller assembly of claim 2, including:
a track shoe attached to said first outer link and said second outer link.

4. The roller assembly of claim 1, including:
a second roller rim secured to said body member, said second roller rim having (i) a second inner side wall segment extending outwardly from said roller surface, (ii) a second outer side wall segment secured to said second inner side wall segment, said second outer side wall segment being positioned relative to said axis of rotation of said body member such that a linear extension of said second outer side wall segment intersects said axis of rotation so as to define an acute angle therebetween,
wherein (i) said first inner side wall segment and said first outer side wall segment define a first flange extending outwardly from said roller surface, (ii) said second inner side wall segment and said second outer side wall segment define a second flange extending outwardly from said roller surface, (iii) a roller space is defined between said first flange and said second flange, and (iv) said roller assembly has no more than said first flange and said second flange extending outwardly from said roller surface.

5. The roller assembly of claim 4, wherein:
said first flange and said second flange each extend outwardly from said roller surface about 20 millimeters to about 30 millimeters.

6. The roller assembly of claim 1, wherein:
said inner entrance is defined by a second edge having a fourth point, a fifth point, and a sixth point disposed thereon, said fourth point, said fifth point, and said sixth point defining a second plane, and
said axle mounting arrangement is positioned within said receptacle such that no portion of said axle mounting arrangement traverses said second plane.

7. The roller assembly of claim 1, including:
an axle (i) positioned within said passageway and (ii) extending through an aperture defined in said axle mounting arrangement.

8. The roller assembly of claim 1, wherein:
said axle mounting arrangement includes (i) a retainer having a cavity defined therein and (ii) a collar positioned within said cavity.

9. The roller assembly of claim 8, wherein:
said retainer is press fit into said receptacle.

10. A roller assembly for an undercarriage of a work machine, comprising:
a body member having (i) a passageway extending therethrough and (ii) a roller surface defined thereon;
a first roller rim secured to said body member, said first roller rim having (i) a first inner side wall segment extending outwardly from said roller surface, (ii) a first outer side wall segment secured to said first inner side wall segment, said first outer side wall segment being positioned relative to an axis of rotation of said body member such that a first linear extension of said first outer side wall segment intersects said axis of rotation so as to define a first acute angle therebetween, and (iii) a first receptacle defined therein, said first receptacle having a first outer entrance and a first inner entrance, said first outer entrance is defined by a first edge having a first point, a second point, and a third point disposed thereon, said first point, said second point, and said third point defining a first plane;
a first axle mounting arrangement positioned within said first receptacle such that no portion of said first axle mounting arrangement traverses said first plane;
a second roller rim secured to said body member, said second roller rim having (i) a second inner side wall segment extending outwardly from said roller surface, (ii) a second outer side wall segment secured to said second inner side wall segment, said second outer side wall segment being positioned relative to said axis of rotation of said body member such that a second linear extension of said second outer side wall segment intersects said axis of rotation so as to define a second acute angle therebetween, and (iii) a second receptacle defined therein, said second receptacle having a second outer entrance and a second inner entrance, said second outer entrance is defined by a second edge having a fourth point, a fifth point, and a sixth point disposed thereon, said fourth point, said fifth point, and said sixth point defining a second plane; and
a second axle mounting arrangement positioned within said second receptacle such that no portion of said second axle mounting arrangement traverses said second plane.

11. The roller assembly of claim 10, including:
a track assembly having (i) a first outer link with a first aperture defined therein, (ii) a second outer link with a second aperture defined therein, and (iii) a track pin positioned within said first aperture and said second aperture,
wherein (i) said first inner side wall segment and said second inner side wall segment define a roller space therebetween, said roller space having a width $W_1$, (ii) said track assembly has a with $W_2$ which is less than said width $W_1$, and (iii) said track assembly is located within said roller space so that said first outer link and said second outer link is in contact with said roller surface.

12. The roller assembly of claim 11, including:
a track shoe attached to said first outer link and said second outer link.

13. The roller assembly of claim 12, wherein:
(i) said first inner side wall segment and said first outer side wall segment define a first flange extending outwardly from said roller surface, (ii) said second inner side wall segment and said second outer side wall segment define a second flange extending outwardly from said roller surface, and (iii) said roller assembly has no more than said first flange and said second flange extending outwardly from said roller surface.

14. The roller assembly of claim 13, wherein:
said first flange and said second flange each extend outwardly from said roller surface about 20 millimeters to about 30 millimeters.

15. The roller assembly of claim 10, including:
an axle positioned within said passageway and extending through (i) a first aperture defined in said first axle mounting arrangement and (ii) a second aperture defined in said second axle mounting arrangement.

16. The roller assembly of claim 10, wherein:
said first axle mounting arrangement is press fit into said first receptacle, and
said second axle mounting arrangement is press fit into said second receptacle.

17. A work machine, comprising:
a frame;

a work implement mechanically coupled to said frame; and a roller assembly mechanically coupled to said frame, said roller assembly having (i) a body member, (ii) a passageway extending through said body member, (iii) a roller surface defined on said body member, (iv) a first roller rim secured to said body member, said first roller rim having (A) a first inner side wall segment extending outwardly from said roller surface, (B) a first outer side wall segment secured to said first inner side wall segment, said first outer side wall segment being positioned relative to an axis of rotation of said body member such that a linear extension of said first outer side wall segment intersects said axis of rotation so as to define an acute angle therebetween, and (C) a receptacle defined therein, said receptacle having an outer entrance and an inner entrance, said outer entrance is defined by a first edge having a first point, a second point, and a third point disposed thereon, said first point, said second point, and said third point defining a first plane, and (v) a first axle mounting arrangement positioned within said receptacle such that no portion of said first axle mounting arrangement traverses said first plane.

18. The work machine of claim 17 including:

a second roller rim secured to said body member, said second roller rim having a second inner side wall segment extending outwardly from said roller surface; and a track assembly having (i) a first outer link with a first aperture defined therein, (ii) a second outer link with a second aperture defined therein, and (iii) a track pin positioned within said first aperture and said second aperture, wherein (i) said first inner side wall segment and said second inner side wall segment define a roller space therebetween, said roller space having a width $W_1$, (ii) said track assembly has a with $W_2$ which is less than said width $W_1$, and (iii) said track assembly is located within said roller space so that said first outer link and said second outer link is in contact with said roller surface.

19. The work machine of claim 17, wherein:

said roller assembly further includes(i) said second roller rim having (A) a second inner side a second roller rim secured to said body member, wall segment extending outwardly from said roller surface, (B) a second outer side wall segment secured to said second inner side wall segment, said second outer side wall segment being positioned relative to said axis of rotation of said body member such that a second linear extension of said second outer side wall segment intersects said axis of rotation so as to define a second acute angle therebetween, and (C) a second receptacle defined therein, said second receptacle having a second outer entrance and a second inner entrance, said second outer entrance is defined by a second edge having a fourth point, a fifth point, and a sixth point disposed thereon, said fourth point, said fifth point, and said sixth point defining a second plane and (ii) a second axle mounting arrangement positioned within said second receptacle such that no portion of said second axle mounting arrangement traverses said second plane.

20. The work machine of claim 19 wherein:

said first inner side wall segment and said first outer side wall segment define a first flange extending outwardly from said roller surface, said second inner side wall segment and said second outer side wall segment define a second flange extending outwardly from said roller surface, said first flange has a height of about 1.5 millimeters, and said second flange has a height of about 21.5 millimeters.

* * * * *